United States Patent [19]

Prodel

[11] Patent Number: 5,412,863
[45] Date of Patent: May 9, 1995

[54] INSTALLATION FOR THE CIRCULATION OF WORKPIECE-CARRYING MOTORIZED PALLETS

[76] Inventor: Jacques Prodel, Rue de Cuts - Carlepont, F 60170 Ribecourt, France

[21] Appl. No.: 965,251
[22] PCT Filed: Apr. 30, 1992
[86] PCT No.: PCT/FR92/00398
 § 371 Date: Jan. 4, 1993
 § 102(e) Date: Jan. 4, 1993
[87] PCT Pub. No.: WO92/19419
 PCT Pub. Date: Nov. 12, 1992

[30] Foreign Application Priority Data

May 2, 1991 [FR] France .................... 91 05414

[51] Int. Cl.$^6$ ............................................ B23P 19/04
[52] U.S. Cl. .................................. 29/799; 29/784
[58] Field of Search ............... 29/33 P, 771, 772, 784, 29/791, 792, 799; 104/287, 290, 291, 292, 300; 198/345.1, 346.1; 414/222, 226

[56] References Cited

U.S. PATENT DOCUMENTS

| | | | |
|---|---|---|---|
| 3,518,945 | 7/1970 | Raney | 104/300 X |
| 3,796,327 | 3/1974 | Meyer et al. | 29/799 X |
| 4,576,099 | 3/1986 | Makino | 104/287 |
| 4,706,796 | 11/1987 | Chambers | 198/346.1 |
| 4,800,818 | 1/1989 | Kawaguichi | 104/292 X |
| 4,884,330 | 12/1989 | Sticht | 414/222 X |
| 4,928,806 | 5/1990 | Anderson | 198/345.1 |
| 4,937,929 | 7/1990 | Nokajima et al. | 29/799 X |

FOREIGN PATENT DOCUMENTS

| | | | |
|---|---|---|---|
| 2190612 | 11/1987 | United Kingdom | 29/799 |
| 9117018 | 11/1991 | WIPO | 29/799 |

Primary Examiner—Peter Dungba Vo
Attorney, Agent, or Firm—Pollock, Vande Sande & Priddy

[57] ABSTRACT

An installation for circulating workpiece-carrying pallets. The installation includes a supporting surface and at least one pallet comprising a plurality of self-orientable rolling members supporting the at least one pallet and rolling on the supporting surface. A plurality of sets of substantially horizontally arranged wheels are mounted on the at least one pallet. The wheels include driven wheels and freely rotating guidance wheels. A plurality of rail members are mounted on the supporting surface. The rail members define a plurality of travel paths for the at least one pallet. The rail members interact with the sets of substantially horizontally arranged wheels to guide the pallet on a desired path. Each of the paths is defined at least partially by a section of parallel rail members. These sets of substantially horizontally arranged wheels are compressibly lodgeable between the parallel rail members. The travel paths are connected by a plurality of interconnections. A plurality of actuable rail members are mounted on the supporting surface at interconnections between the travel paths. The position of the actuable rail members may be altered to alter the travel path of the at least one pallet.

22 Claims, 11 Drawing Sheets

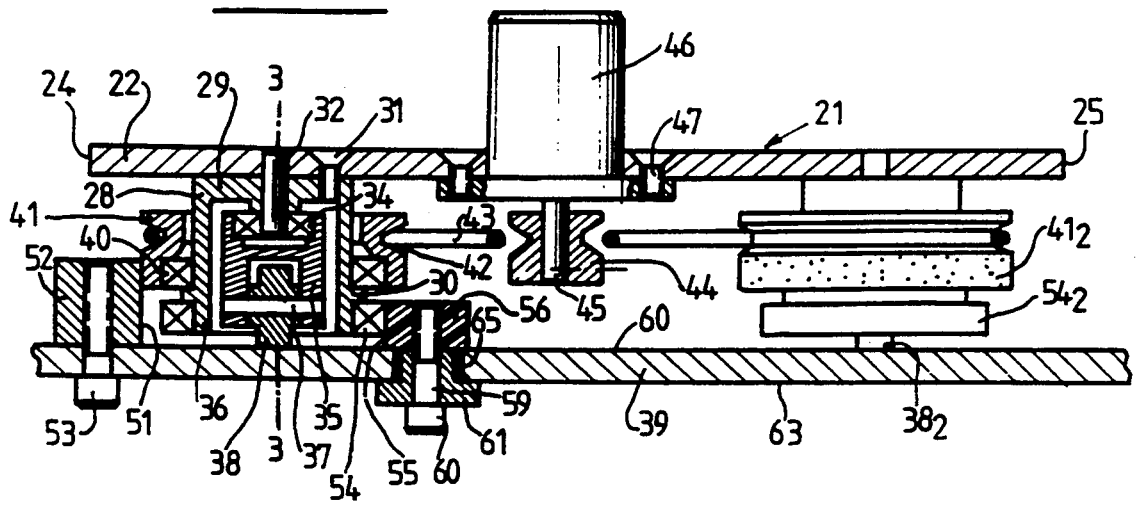
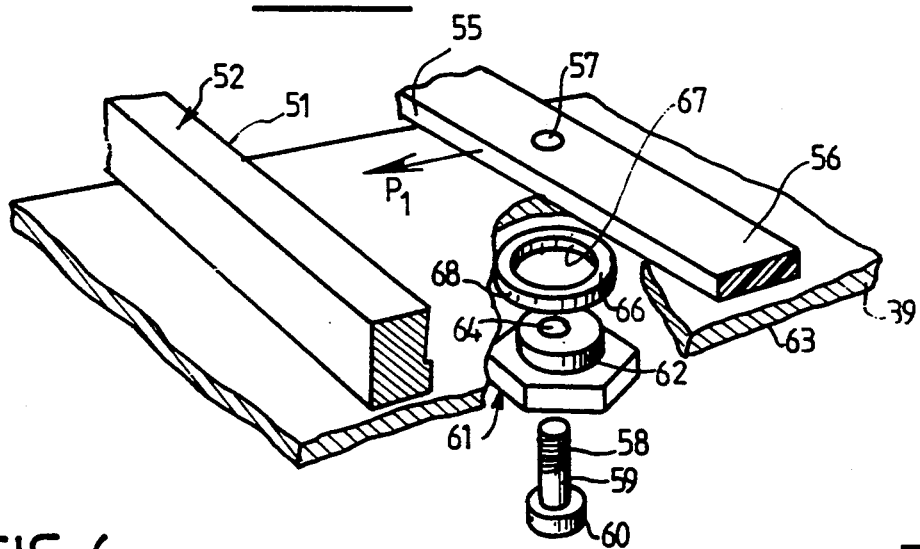
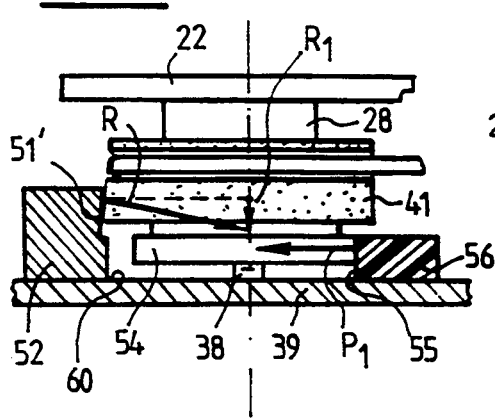
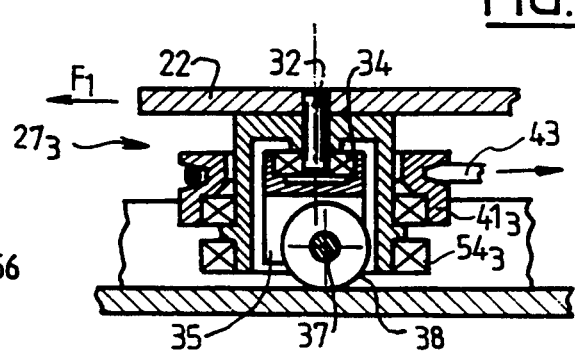

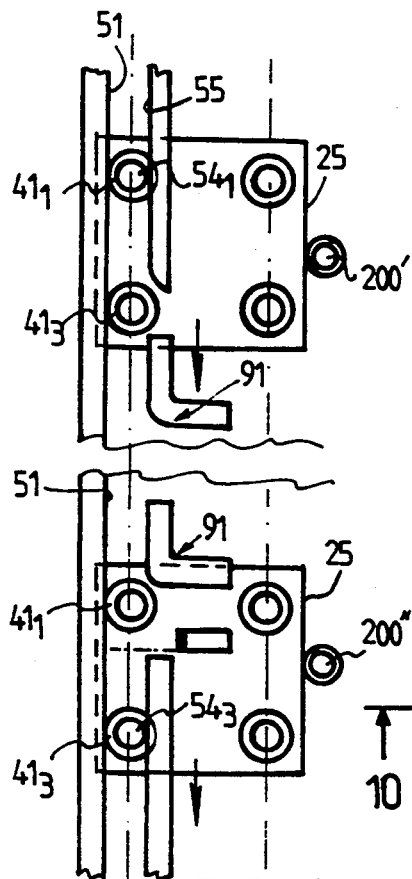
FIG. 12
FIG. 13
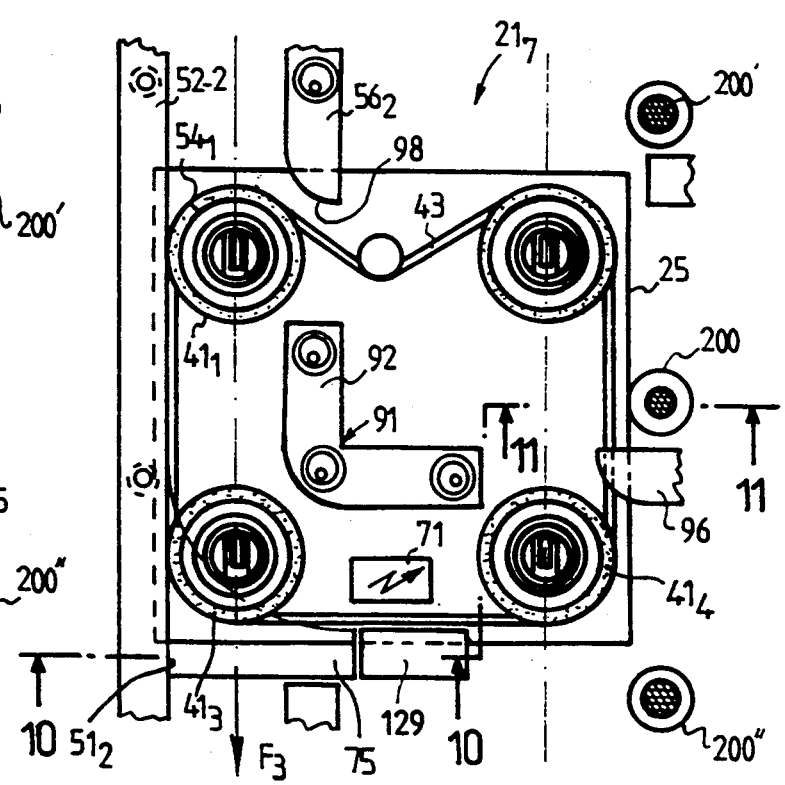
FIG. 10
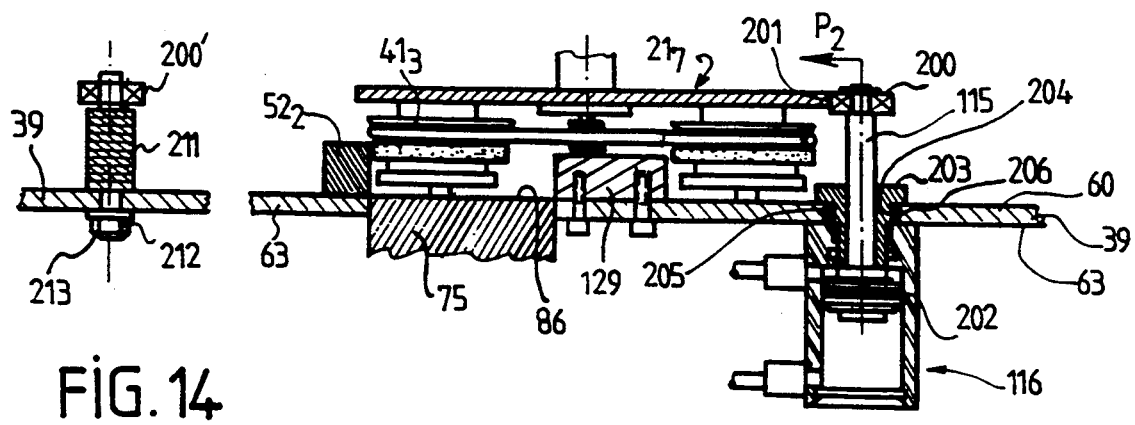
FIG. 14
FIG. 11

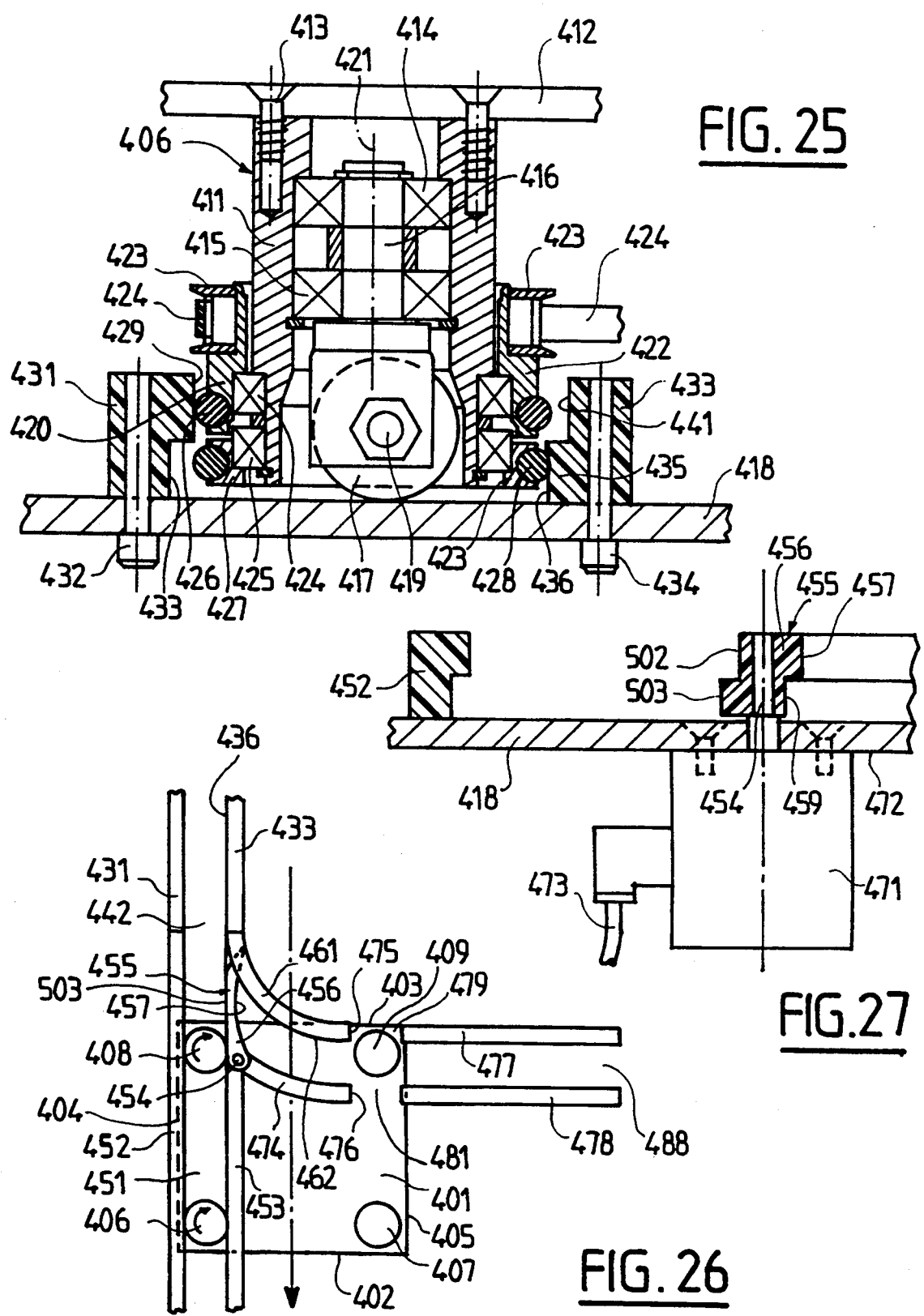

INSTALLATION FOR THE CIRCULATION OF WORKPIECE-CARRYING MOTORIZED PALLETS

FIELD OF THE INVENTION

The present invention relates to installations for machining and/or assembling workpieces in which the workpieces to be machined and/or assembled are carried by circulating pallets which bring them to one or a plurality of machining and/or assembly stations where they are immobilized so as to permit the machining and/or the assembly of the workpieces and, from there, move towards another station, and so on.

BACKGROUND OF THE INVENTION

In a general manner, in the field of the automated transfer of workpieces from one station to another station, various systems have been developed and are currently used.

In some of these systems, self-guided autonomous carriages comprise an electric motor powered by a battery of accumulators which the carriages carry. The battery is rechargeable with energy at the work stations or in parking zones.

These motorized carriages are of large dimensions approximately 0.5×1 m to 1×2 m) and are generally used for transporting voluminous and/or heavy workpieces (from 25 kg to 500 kg) and circulate at low speed (10 m/min to 40 m/min on average).

These pieces of automatic handling equipment move inside production workshops along routes which have been partially or totally defined previously. They have piloting means integral with the carriages so as to slave their steering and their circulation speed as a function of a permanent or discontinuous detection of the route traveled and of that still remaining to be traveled.

This technique envisages numerous embodiments which allow these carriages to circulate in complete safety by means of on-board sensors of various natures. The types of sensors include electromechanical sensors, especially combined with bumpers actuating one or a plurality of operating switches. Inductive, optical, telemetric, among other sensors may also be used. These environment sensors are combined with the circuits for slaving the clutches, brakes, and speed variators of the motor or motors of these carriages. They control the braking, deceleration and stopping so as to avoid any abrupt collision with other carriages or obstacles or else their slow advancement and their stopping in each positioning zone provided at the work stations. The work stations often comprise the means for recharging carriages' batteries.

Moreover, the progress made in miniaturizing motors and sensors, combined with widespread, inexpensive control electronics, have permitted this well-known technology to be transferred to applications relating to the entrainment of pallets of small dimensions (0.3 m×3.4 m) in installations provided for machining and/or assembling workpieces of low weight (from 1 kg to 45 kg) circulating at high speed (120 m/min).

Numerous embodiments calling upon motorized pallets exist. These pallets are of a size very close to that of remotely guided toy cars and their respective motorization method is generally similar to that of such toys. They are equipped with an electric geared motor supplied from a battery which they carry. The motor is slaved in speed by various electronic circuits managing the acceleration and braking of two or four drive wheels rotating about horizontal axes.

Taking this prior art into account, there have more recently been proposed embodiments relating to installations for assembling and/or machining for the manufacture of workpieces of small dimensions carried by motorized pallets. Embodiments can be distinguished from one another generally by the constitution of the entrainment means of these pallets interacting with straight or curved devices for guiding them and suitable for ensuring their changes of direction on a floor, on rails, or on other supports.

The most recent installations in this field are based on the "off line" working principle. The majority of assembly and/or machining operations take place there, outside of a general circulation line, in circuits which bypass this line. The manual and/or automatic work stations are, therefore, outside of the general high-speed circulation line of the pallets, in a bypass circuit, along which the assembly and/or machining operations are carried out.

The most compact installation is obtained when the changes of direction of the pallets are performed at a right angle without changing the spatial orientation of the pallets.

But, on the other hand, to make these installations able to be exploited as universally as possible, often implies that during a change in direction, these pallets modify their orientation. For example, in the case in which reasons of ergonomics or the technical necessities are more important than the criteria of the bulk of their bend surface area.

The latest progress achieved in the architecture for mounting the various pieces of base equipment led to the production of more and more compact installations comprising a very high density of circulation tracks with numerous crossroads and changes of direction which are very often less than 0.5 m apart.

Under these conditions, the top speeds of more than 100 m/min indicated by the motorized pallet constructors are not very significant, because they are almost never reached in very compact installations.

The true overall exploitation performances of these installations are, in fact, essentially linked to the acceleration and deceleration performances of the pallets, mainly in the bends which occur at very short intervals. Moreover, the braking capability of the pallets without skidding is also a determining factor when they circulate at high speed. The risks of collision are not excluded, especially when one pallet changes circulation direction leaving the main circulation track, without changing its spatial orientation, so as to reach an "off line" station situated on a track in bypass. This pallet therefore constitutes an obstacle for the pallet which follows.

A related problem resides in the difficulty of making the pallets circulate at high speed without the workpieces. The workpieces are often unstable in the phase in which they are placed on the pallet, before being assembled or machined. As a result of this instability, the workpieces may be thrown off due to the vibrations and shocks generated in the very short bends of the pallets.

Finally, in a general manner, it is desired to cause the pallets to circulate for many hours, without cleaning the installation. But, it has been observed that, in such a case, the adherence of the self-driven pallets on a floor or the like becomes random due to soiling in the form of grease, oil, and/or shavings, among other causes, which affects the circulation line. The effect of the soiling is more harmful the greater the weight of the load transported.

SUMMARY OF THE INVENTION

The objective of the invention is to produce a novel type of assembly and/or machining installation with self-steering motorized pallets, with prestressed guidance, without play, in which the design of the drive wheels and associated entrainment paths permits the precise movement of the pallets without parasitic skidding, with maximum efficiency, and which is mostly free from the weight of the load transported. In practice, this invention permits exceptional speeds of the pallets in the changes of direction, with a minimum turning radius and a non-skid behavior of the drive wheels with absolute efficiency.

The solution proposed satisfies four types of problems overall.

The first problem relates to the universal use of the means for entraining the pallet, combined with its means for guidance on a floor, so as to make it circulate without discontinuity with the same operational principle both on straight and on curved circulation tracks, with or without a change in its spatial orientation.

The second problem is that of precisely guiding, without play, the pallet, both in a straight line and in the bends. This circulation precision offers numerous advantages, especially for the positioning of workpieces by robots on the moving pallets, under conditions which are all the more economic the more precise the guidance is at the moment of this operation.

The third problem is that of permanently mastering the excellence of the "road holding" of the pallet, both in a straight line and in the bends, that is to say, the pallet's adherence capability without resulting in skidding on the circulation tracks, mainly at the moments of its greatest acceleration or hardest braking produced over the shortest distances. The best performances are obviously reached when the driving force of the pallet calls for a greater number of drive wheels in the difficult passages and when their respective entrainment or braking means interact in a balanced fashion, without parasitic sliding, both in a straight line and in the bends, with or without change in the spatial orientation of the pallets.

In the known solutions, the "road holding" and the acceleration and deceleration performance of the pallet are very much dependent on the weight of the load transported. Thus, when the pallet is not loaded, its drive wheels risk gliding under the effect of too great an acceleration of the speed of its motor. This drawback consequently leads the constructors to limit these accelerations. The same applies to the decelerations whose value must not be too great, especially when the pallet is very loaded and has a high tendency for uncontrolled skidding, particularly when the rolling paths are greasy.

The fourth problem is that of the reliability and maintenance of the means for entraining the pallet whose "tires", or the like, and the covering of the circulation "tracks" in these installations constitute wearing components which have to be changed. This problem is particularly significant when the four drive wheels of the pallet are mounted on two parallel motor shafts with horizontal axes with respect to their entrainment floor and when they are not orientable in the bends. This problem results in a phenomenon of parasitic slipping or skidding of the pallet during its changes of direction and a significant wear of its drive wheels and entrainment paths.

The invention best satisfies the conditions set out hereinabove.

The installation, according to the invention, for machining and/or assembling workpieces carried by rectangular pallets comprising self-orientable rolling means on a floor is characterized in that each pallet is equipped with devices, or blocks, with roller bearings which serve as a support for the rotary non-slip entrainment means, with vertical axes, set in motion by a motor carried by the pallet. These devices or blocks also interact singly or in groups, according to a multiplicity of combinations, with prestressed self-steering guidance and bearing means partly securely fastened to the floor so as to permit the movement of the pallet, without discontinuity, according to a precise, straight or curved movement which retains or modifies, according to the bearing/guidance combination of the pallet, the spatial orientation of the latter during its changes in direction.

BRIEF DESCRIPTION OF THE DRAWINGS

In the description which follows, given by way of example, of an installation according to the invention, reference is made to the appended drawings in which:

FIG. 2 represents a partial transverse sectional view of a pallet, on a larger scale than that shown in FIG. 1;

FIG. 3 represents a sectional view along the line 3—3 of FIG. 2;

FIG. 5 represents a perspective and partial cut-away view of a part of a floor showing, separated from one another for better understanding and on a larger scale, some of its components;

FIG. 6 represents a sectional view of another embodiment of the configuration of an entrainment rail;

FIG. 10 represents a view of a pallet in line with the crossroads between the general circulation line and a bypass and continuing its travel along the general line;

FIG. 11 represents a sectional view along the line 10—10 and 11—11 of FIG. 10;

FIG. 12 represents a pallet slightly upstream of the one shown in FIG. 10;

FIG. 13 represents a pallet downstream of the position shown in FIG. 10;

FIG. 14 represents a cross sectional view of the mounting of a guidance roller bearing;

FIG. 25 represents a vertical sectional view of a block device fixed to a corner of a pallet, for another embodiment of the installation;

FIG. 26 represents a plan view of part of the installation, for this embodiment showing a pallet having cleared a crossroads without changing direction;

FIG. 27 represents a sectional view of a device for controlling switching points provided at a crossroads;

DETAILED DESCRIPTION OF PREFERRED EMBODIMENTS OF THE INVENTION

Figure 1:
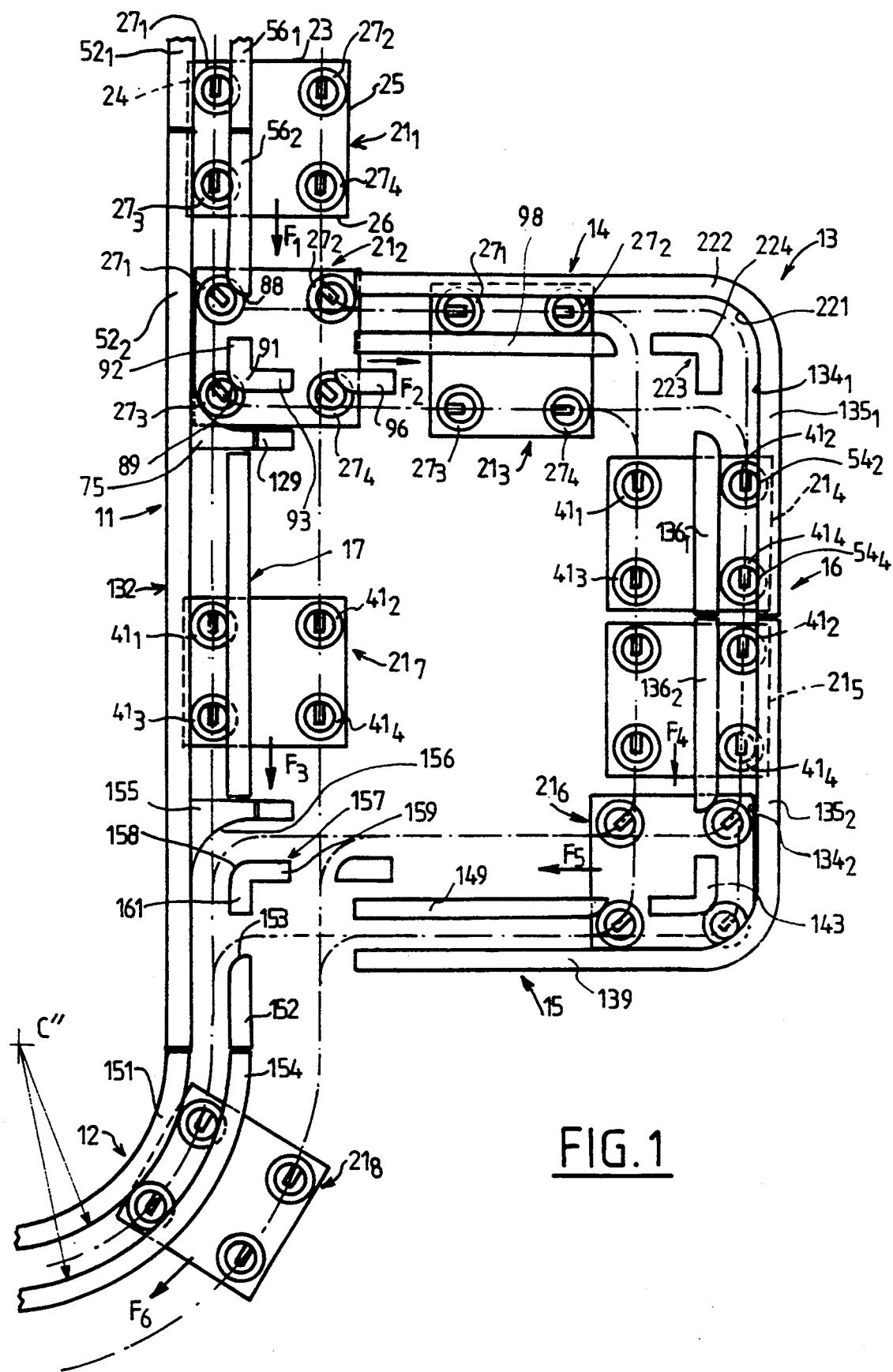
FIG. 1 represents a bottom plan view of an installation according to an embodiment of the present invention.

FIG. 1 shows, seen from below, part of an installation according to the invention in which the floor is assumed to be transparent. The embodiment shown in FIG. 1 comprises a straight general circulation track 11, followed by a curved part 12. A bypass 13, with a branch 14 extends from the straight general circulation track. The branch 14 may be connected to and perpendicular to the general circulation line or track. A branch 15, parallel to the branch 14, connects the bypass to the general line 11. The branches 14 and 15 are connected by a part 16 parallel to the general line.

On this part of the installation, a first pallet 21-1 is circulating on the general line 11, upstream of the bypass 13. A pallet 21-2 is traveling at the connection between the general circulation line 11 and the bypass 13 branch 14 and engaging in the latter. Additionally, a pallet 21-3 is located in the branch 14 of the bypass 13. Two pallets 21-4 and 21-5 are situated on the part 16 of the bypass 13 parallel to the general line 11. The pallet 21-5 is in an assembly and/or machining position. Also, a pallet 21-6 is positioned at the connection between the part 16 of the bypass 13 and the branch 15 of the bypass. Further, a pallet 21-7 is lying on the part 17 of the general circulation line between the branches 14 and 15 of the bypass 13. A remaining pallet 21-8 is circulating on the curved part 12 of the circulation line.

A pallet 21-n shown in FIGS. 1 and 2 comprises a pallet body, or platform 22, of generally rectangular shape, limited by edges 23, 24, 25 and 26. The pallet comprises, in the vicinity of its corners, blocks 27-1, 27-2, 27-3, 27-4 respectively which are identical to one another. A block 27 consists of a cylindrical shaft 28 (FIG. 2) whose upper bottom 29 is fixed to the platform 22 by one or more screws 31 passing through the platform. An axle 32 passes through the platform 22 and the bottom 29 in the center of the latter and serves for positioning the inner ring of a ball bearing 34. An outer ring of the ball bearing forms part of a sleeve 35, and is thus coaxial with the body 36 of the shaft 28. The lower part of the sleeve 35 serves as a support for the horizontal axle 37 of a wheel 38 provided for moving the pallet on the floor 39 of the installation. The mean line of the axle 37 is a distance from the extension of the mean line of the axle 32 as shown in FIG. 3.

Each pallet 21 runs on the upper face 60 of the floor 39 via four wheels 38-1, 38-2, 38-3, 38-4 placed at its corners. The mounting of the wheels makes them self-orientable. Also, the weight of the load transported is supported by the wheels.

On a shoulder 30 of the body 36 of the shaft 28 there is further mounted, by means of a ball bearing 40, a pulley 41, with a groove 42 provided for the passage of a belt 43. There are thus, equipping one pallet, four pulleys 41-1, 41-2, 41-3, 41-4, functioning as drive wheels, with a vertical axis (FIG. 4), over which wheels the belt 43 passes. Between the drive wheels 41-1 and 41-2 the belt 43 passes over a small pulley 44 wedged on the end of an output shaft 45 (FIG. 2) of an electric motor or geared motor 46. The motor is fixed to the platform 22 of the pallet by screws 47 and is fed by a battery (not shown).

Figure 4:
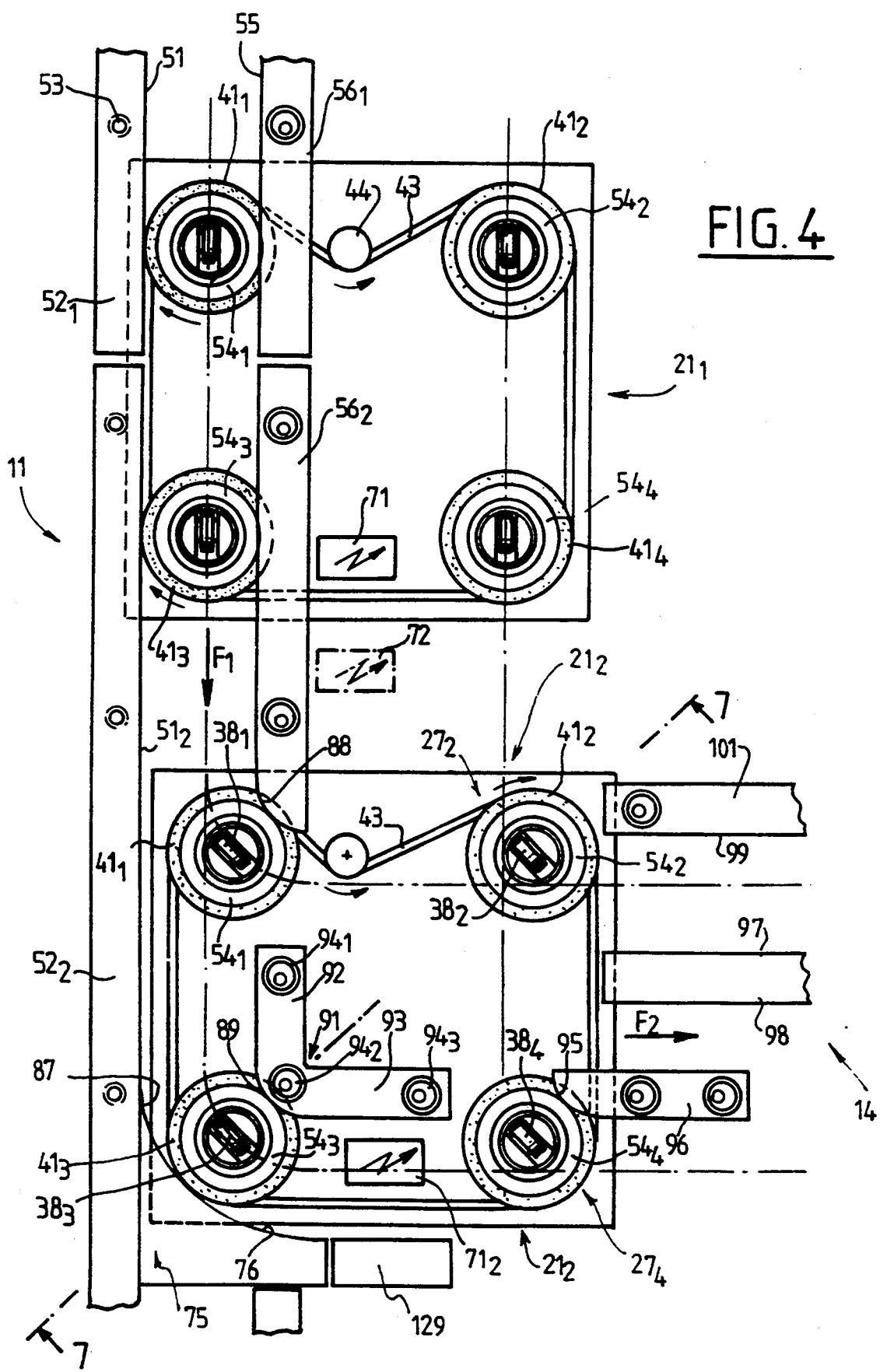
FIG. 4 represents a view of part of FIG. 1, but on a larger scale.

In the position shown in FIGS. 2, 3 and 4, the drive wheels 41-1 and 41-3 of the pallet 21-1 interact with the inner face 51-1, 51-2 of a rail 52-1, 52-2 or entrainment rail, fixed to the floor 39 of the installation by screws 53.

The rail 52, of rectangular cross section, is advantageously made of steel or of a plastic such as that known under the name of DELRIN.

The running path of the drive wheels 41 of the pallet on the rail 52 is generally vertical and situated overhanging the floor 39. This arrangement has the advantage of exposing the drive wheels or pulleys 41 and their entrainment paths as little as possible to the soiling (grease, oil, shavings, etc.) which mainly affect the generally horizontal circulation surface 60 of the floor 39.

The lower part of the shaft 28 of a block 27 interacts, by means of a ball bearing 54, with the inner face 55 of a second rail 56 or guidance rail. The second rail is parallel to the rail 52, and is not as high as the latter. The rail 56 is also advantageously made of steel or of a plastic such as DELRIN.

The rail 56 has, evenly distributed over its length, perforations 57, shown in FIG. 5. Each perforation serves to house the threaded end 58 of a screw 59 for fastening the rail, with a head 60. Each screw 59 passes through the floor 39 with interposition of a nut 61 with a hexagonal head and cylindrical ring 62 and which bears against the lower face 63 of the floor. The nut 61 is passed through by a channel 64. The channel is off-centered with respect to its side face and the ring 62 and serves for the passage of the screw 59. Between the cylindrical ring 62 and the perforation 65 of the floor 39 provided for its passage there is housed an annulus 66 made of an elastomeric material. The annulus has an inner face 67 and an outer face 68.

After loosening the screw 59 it is possible to modify, by rotating the nut 61, the angular position of the ring 62. Due to the eccentricity of the ring, the transverse position of the corresponding part of the rail 56 may also be altered. Retightening the screw 59 maintains the new position of the ring and the rail.

The distance between two consecutive fastening devices with an eccentric member depends on the resilience of the guidance rail 56 and on the possibility of crushing the annulus 66 made of elastomer material.

When the electric motor or geared motor 46 is powered, it entrains, by means of the small pulley 44, the belt 43 which, in turn, entrains the drive wheels 41-1, 41-2, 41-3, 41-4. The drive wheels 41-1 and 41-3 of the pallet 21 are applied under pressure via their rim against the lateral face 51 of the rail 52-1, 52-2. The application pressure results from the action of the inner face 55 of the guidance rail 56 against the roller bearings 54-1 and 54-3 of the blocks 27-1 and 27-3.

Each pallet is thus guided by its prestressed roller bearings for bearing. In the position shown in FIGS. 3 and 4, the pallet 21-1 is guided by its roller bearings 54-1 and 54-3 interacting with the path 55 of the guide rail 56-1 and 56-2 which is vertical and has the same cleanliness advantages as the entrainment path 51.

The trajectory of the pallet 21 is thus strictly determined, without play, as represented diagrammatically by the arrow F1 shown in FIGS. 3 and 4.

The prior setting of the position of the guidance rail 56, by adjusting the angular positions of the nuts 61, permits the pressure of the drive wheels on their entrainment path to be set to the desired value. This pressure, represented diagrammatically by the arrow P1, is of an elastic nature by virtue of the presence of the annulus 66 made of an elastomer material. The action of the annulus is that which corresponds to a force whose value may be several times greater than the weight of the maximum load likely to be carried by the pallet.

In the embodiment shown in FIG. 6, the operational face of the entrainment rail 52 has an oblique part 51' moving close to the axis as the upper face 60 moves away from the floor 39. The drive wheel or entrainment pulley 41 is pushed under pressure by the interaction of the face 55 of the guidance rail 56, as represented diagrammatically by the arrow Pl. The reaction brought about by the interaction of the drive wheel 41 with the oblique face 51' is directed downwardly as shown by the arrow R. A component of R represented by the arrow R1, contributes to pushing the wheel 38 under pressure against the upper face 60 of the floor 39.

In the absence of any load transported by the pallet, the drive wheels are pushed against the entrainment path with a force whose value may reach several tens of kilos. No jumping of the drive wheels is possible. The "road holding" of the pallets is thereby further enhanced.

The adherence of the rims of the drive wheels 41 or pulleys on the entrainment paths is improved by the fact that they are made of a flexible plastic or comprise an attached coating made of a slightly deformable elastomer.

In other embodiments, the drive wheels have teeth which interact, when running, with conjugate hollows made in the entrainment rails.

The non-skid feature of the drive wheels is thus ensured by being almost totally free from the weight of the load transported.

In other embodiments or configurations, it is the entrainment rail which is mounted on the floor by means of eccentrics and annuli made of elastomer, so that it is pushed directly against the drive wheel or drive wheels 41 with which it interacts. The other parallel rail continues to fulfill its role as a guidance rail, interacting with the guidance roller bearings of the blocks of the pallet. The application under pressure here is obtained by the action of the entrainment rail.

In all cases, the distance between the opposing faces of the two rails, respectively, the entrainment rail and the guidance rail, is smaller than the sum of the radii of the pulleys 41 and of the roller bearings 54. The difference between the distance between the rails and the sum of the radii is on the order of 0.5 mm.

From the position of the pallet 21-1 shown in FIG. 1, the pallet may either continue its trajectory along the line 11 so as to reach a position like that shown by the pallet 21-7, or engage in the branch 14 of the bypass 13, provided, for example, for processing workpieces carried by the pallets which travel along it. The choice between these two routes depends on the interaction between an electronic memory 71 equipping the pallet and a reading head 72 carried by the floor as shown in FIG. 4.

In the case where the pallet must change direction, as shown at 21-2 in FIG. 4, the electronic memory 71 has sent a signal to the reading head 72, which has brought about the erection of a bypass stop 75 (FIGS. 4, 7 and 8) having a concave cylindrical face 76.

Figure 7:
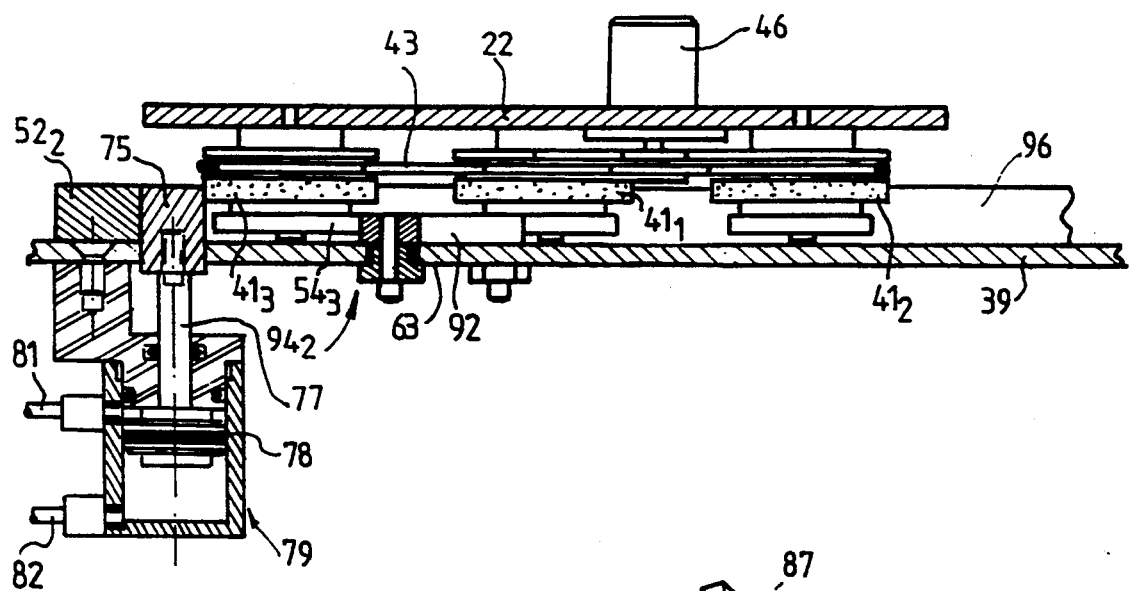
FIG. 7 represents a sectional view along the lines 7—7 of FIG. 4, showing a pallet in line with a crossroads, changing direction without changing its spatial orientation.
Figure 8:
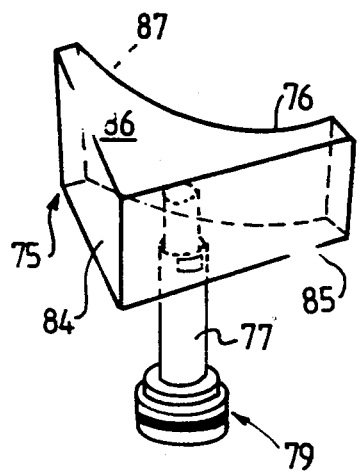
FIG. 8 represents a perspective view of a retractable bypass stop.

The bypass stop 75 is carried by the rod 77 of a piston 78 of a jack 79 lying under the floor 39 and whose supply tubes are shown at 81 and 82 (FIG. 7).

The bypass stop 75 is in the general shape of a triangular prism (FIG. 8) limited, other than by the concave cylindrical face 76, by plane lateral faces 84 and 85 and an upper face 86.

In the condition shown in FIGS. 4 and 7, the pallet 21-2 has undertaken its bend by the interaction of the drive wheel 41-3 with the end 87 of the concave cylindrical face 76. The face 76 thus fulfills the role of entrainment rail, the drive wheels 41-1 and 41-3 having abandoned the face 52-2 of the entrainment rail 52-2 as soon as the drive wheel 41-3 starts to interact with the cylindrical face 76 of the bypass stop 75.

In this phase, the roller bearing 54-1 of the block 27-1 interacts with the inwardly curved end 88 of the guidance or prestressed rail 56-2. The roller bearing 54-3 of the block 27-3 interacts with the convex outer part 89 of a bracket 91 with two branches, one of which, 92, is in the extension of the prestressed rail 56-2, and the other, 93 is perpendicular to the first. The bracket 91 is mounted on the floor 39 of the installation by means of devices with an eccentric 94-1, 94-2, 94-3, each of which has the construction shown in FIG. 5.

The roller bearing 54-4 of the block 27-4 interacts with the inwardly curved end 95 of a guidance and prestressed rail portion 96 in the extension of the branch 93 of the bracket 91.

In its right angle bend, which may have a very short radius, the pallet may be maintained positively at three of its "points", or more exactly of its vertical lines, by roller bearing contacts. Thus, without any resistance to its advancement resulting therefrom, the precision of the pallet's trajectory remains ensured by the effect of the prestressed mounting of the rail portion 56-2 of the bracket 91 and of the rail portion 96 by means of the devices with an annulus made of elastomer.

In the position shown in FIG. 4, which is midway through the bend, the self-orientable wheels 38 of the pallet 21-2 are at 45° with respect to the direction of the general circulation line 11 and of the perpendicular bypass line 14.

Entrainment of the pallet is carried out by a single drive wheel 41-3, while the pallet's prestressed guidance is permanently ensured by three of the guidance roller bearings 54-1, 54-3, 54-4. The drive wheel runs without skidding on the cylindrical surface 76. This directly counteracts the effects of centrifugal force generated by the curved traveling speed of the pallet.

The pallet thus changes circulation direction without changing its spatial orientation. Upon exiting the bend, the drive pulley 41-3 of the pallet interacts with the entrainment rail portion 129, the ball bearing 54-3 interacts with the branch 93 of the bracket 91, the ball-bearing 54-4 interacts with the rail portion 96, the drive pulley 41-2 interacts with the face 97 of the entrainment rail 98, and the ball bearing 54-2 interacts with the face 99 of the rail 101.

Figure 9:
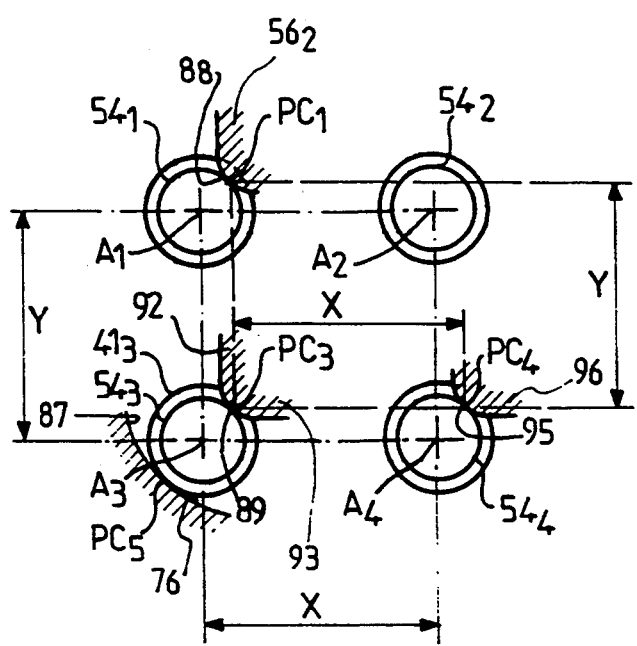
FIG. 9 represents an illustration of the determination of the inwardly curved parts of the guidance and entrainment rails in a crossroads between a circulation branch and a perpendicular branch.

FIG. 9 shows the blocks with roller bearings 54-1, 54-2, 54-3, 54-4 whose axes of rotation A-1, A-2, A-3, A-4 on one pallet form the vertices of a rectangle whose sides have the dimensions Y and X. The points of contact of the roller bearings with their respective guidance rails are PC-1, PC-3 and PC-4.

In order to permit a bend without change in orientation of the pallet, the curves 88 and 89 are produced by construction such that the distance between the two points of contact PC-1 and PC-3 is always equal to the distance between the axes, dimension Y, of the blocks with roller bearings 54-1 and 54-3, and so that the straight line between end points PC-1 and PC-3 moves parallel to itself during the route of the pallet through this bend.

At the same time, the point of contact PC-4 describes the curve 95 which, by construction, is produced so that the distance between the two points of contact PC-3 and PC-4 is always equal to the distance X between the blocks with roller bearings 54-3 and 54-4 and so that the straight line between end points PC-3 and PC-4 moves parallel to itself during the route of the pallet through this bend.

The pallet is thus guided at three points of contact which define two perpendicular straight lines which move parallel to themselves while each respectively maintaining the same spatial orientation while the pallet traverses the bend. Opposite these three guidance points, the drive wheel 41-3 bears upon the concave cylindrical face 76 at a point of contact PC-5.

As the pallet goes through the bend, the point of contact PC-5 describes the curve 76, while the point of contact PC-3 describes the curve 89. The shape of the curve 76 can therefore be deduced from the shape of the curve 89 by interposing a constant gap equal to the distance between PC-5 and PC-3 between them. The gap is also equal to the sum of the dimensions of the radius of the drive pulley 41-3 and of the radius of the guidance roller bearing 54-3.

The shapes of the curves 88, 89, and 95 of the guidance rails and the complementary shape of the bearing and entrainment rail 76 are determined so as to optimize the passage of the pallet through the curve at very high speed.

Generally these various curves 88, 89, and 95 are quarters of a circle which have an identical radius of, for example, 20 mm for the curves 88, 89, and 95 and a radius equal to 20 mm, to which the sum of the dimensions of the radius of the pulley and of the radius of the roller bearing is added for the curve 76. The curves 76 and 89 are concentric quarters of a circle.

When the pallet has completed its bend, its entrainment is continued by interaction of the drive wheels 41-1 and 41-2 of its blocks 27-1 and 27-2 with the face 97 of an entrainment rail 98, as shown in FIGS. 1 and 4. The stressing of the drive wheels against the face results from the interaction of the face 99 of a prestressed guidance rail 101 with the roller bearings 54-1 and 54-2 of the pallet 21-3.

The condition for maintaining the pallet shown at 21-3 during this journey is, therefore, the same as that which has been described hereinabove when the pallet 21-1 journeys along the general circulation line 11.

When, reaching the vicinity of the junction between the general circulation line 11 and the bypass branch 14, the pallet must continue to follow the general line and not engage in the perpendicular bypass branch 14, as shown in FIG. 10. The electronic memory 71 of the pallet does not actuate the erection of the bypass stop 75 and the entrainment of the pallet continues to be done by interaction of the drive wheels 41-1 and 41-3 with the entrainment rail 52-2. In contrast, the electronic memory has actuated, as shown in FIG. 11, the device for erecting a ball bearing 200 serving as a lateral guidance stop to the displacement of the pallet 21-7 when the pallet is in line with the crossroads and must not take the branch 14 of the bypass 13. The ball bearing 200 is carried by the rod 115 of the piston 202 of a jack 116. The jack body 116 is fixed under the face 63 of the floor 39 by means of a threaded connector 203 which bears on the upper face 60 of the floor 39. This connector 203 has a cylindrical part 204 whose length is slightly greater than the thickness of the floor 39. The cylindrical part 204 passes through an annulus 205 made of an elastomer whose external face is compressed in a bore 206 passing through the floor 39. The fastening of the jack 116 to the floor 39 is thus "floating".

The position of the jack 116 on the floor is such that when the rod 115 of the jack is withdrawn, the horizontal distance between the axis of the roller bearing 200 and the edge 25 of the pallet is smaller, typically on the order of one millimeter, than the dimension of the radius of the outer cage 201 of the roller bearing 200. In this condition, the roller bearing 200 is inoperative. When the rod 115 of the jack is pushed out and the edge 25 of the pallet comes into contact with the cage 201 of the roller bearing 200, the cage of the roller bearing moves laterally under the effect of the advancement of the pallet, thereby deforming the elastomeric annulus 205 which participates in elastically fastening the jack 116 to the floor 39.

In FIG. 11, the bypass stop 75 is in its retracted position and its upper face 86 is in the extension of the upper face 60 of the floor 39.

In this part of its travel, the pallet 21-7 is therefore entrained by its drive wheels 41-1 and 41-3 interacting with the part of the inner face 51-2 of the entrainment rail 52-2. The stressing force for this part of the travel results from the pressure P2 exerted by the prostressed bearing of the roller bearing 200.

Upstream and downstream of this crossover position, the condition is that shown by FIGS. 12 and 13. The edge 25 hence interacts with a ball bearings 200' and 200" respectively mounted at the end of a cylindrical rubber block 211, shown in FIG. 14, which is fixed to the floor 39 by a nut 212 and a threaded rod 213.

In the part of the journey which follows, the pallet is entrained in a manner identical to that before reaching the bypass line, the movement of the pallet being represented diagrammatically by the arrow F3.

When, after having taken bypass 13, pallet 21-3 comes to the end of branch 14, it continues its travel without changing orientation, along part 16 of the bypass 13, shown in FIG. 1. The pallet is guided by quarter of circle part 221 of the rail 222 and by the convex part 224 of a bracket 223, until it comes to part 16 of the bypass 13.

During its circulation on part 16, the pallet, as shown at 21-4, is entrained by interaction of its entrainment pulleys 41-2 and 41-4 with the inner face of the facing rail portion 136-1. A prestress is supplied by interaction of the roller bearings 54-2 and 54-4 with the inner face 134-1 of the rail 135-1.

Figure 15:
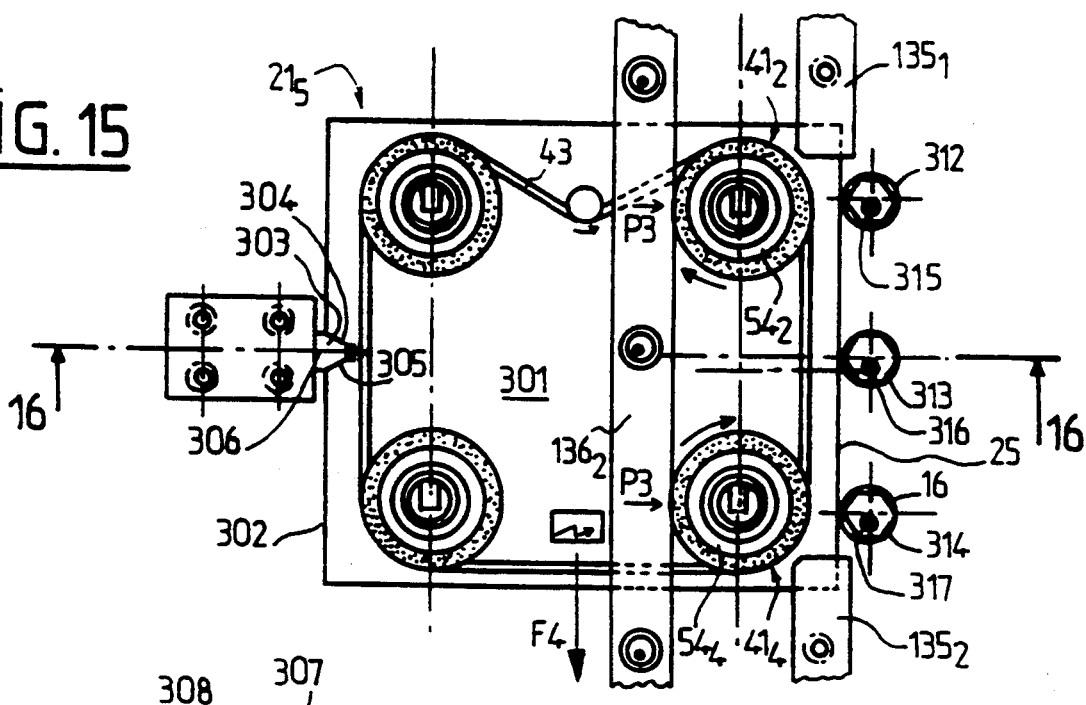
FIG. 15 represents a pallet in the position for machining and/or assembling the workpiece which it carries, for one embodiment.
Figure 16:
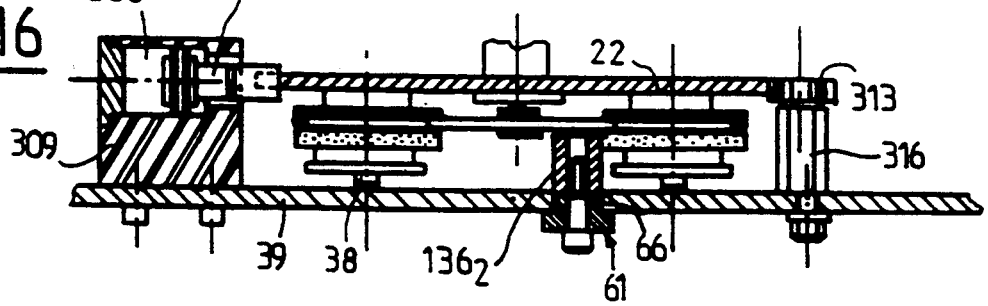
FIG. 16 represents a sectional view along the line 16—16 of FIG. 15.

FIGS. 15 and 16 show a different embodiment from the embodiment shown in FIG. 1. FIG. 1 shows a pallet 301 in the machining or assembly position on the part of the circulation track 16 parallel to the general line 11 rather than pallet 21-5, shown in FIG. 1.

Previously, the circulation of the pallet was maintained by the interaction of its entrainment pulleys 41-2 and 41-4 with the inner face of the rail portion 136-2. The rail portion 136-2 acted as a prestress rail with the aid of the devices with an eccentric 61 and an annulus made of elastomer 66, as shown in FIGS. 5 and 6. The prestressed entrainment rail 136-2 exerts a pressure P3 on the pulleys 41-2 and 41-4. The pressure has the effect of pressing the edge 25 of the pallet 301 against the outer cages of ball bearings 312, 313, 314. The ball bearings provide the lateral guidance of the platform 22 carrying the workpieces to be assembled and/or machined, without play.

This precision guidance is thus directly produced by the reference edge 25 of the platform 22 of the pallet. Preferably, the platform is made of hardened and tempered ground steel. It is substituted for the less precise guidance produced previously by the lower part of the blocks 27-2 and 27-4 whose roller bearings 54-2 and 54-4 were pressed onto the guidance rail 135-1, which was generally made of plastic.

The precise guidance edge of the platform of the pallet interacts with the ball bearings 312, 313, and 314 respectively, mounted at the end of hexagonal columns 315, 316, and 317, shown in FIG. 16. Each bottom part of a column has a cylindrical rod for positioning, without play, in a precise bore passing through the floor 39. The axis of this cylindrical rod is off-centered with respect to the axis of the roller bearing. The end of the cylindrical rod is threaded so as to receive a nut serving to eccentrically fasten the roller bearing-carrying column to the floor 39.

The prior setting of the position of the roller bearings 312, 313, and 314 for guiding the platform of the pallet by adjusting the angular positions of the axis of the hexagonal columns 315, 316, and 317 permits the lateral guidance of its straight circulation trajectory to be set with very great precision. The excellence of this precision especially permits the depositing of workpieces by robots on the moving pallet.

In the case where assembly and/or machining necessitates precise stopping of the pallet on its circulation track, with respect to a work station which is fixed in relation to the floor 39, the platform 22 of the pallet 301 has, on its edge 302, a particular embodiment allowing it to be indexed. For this purpose, a notch 303 with oblique faces 304 and 305 is intended for the engagement of complimentary shaped appendage 306. As shown in FIG. 16, the appendage forms the end of a piston 307 sliding in a cylindrical bore 308 which a block 309 fixed to the floor 39 of the installation exhibits.

With the aid of its drive means, the pallet stops approximately to within plus or minus 1 mm of its indexing position. The slaving logic of the associated piston 307 and appendage 306 then actuates its indexing action. The indexing action longitudinally repositions the platform 22 of the pallet very precisely on its circulation track and thus permits the correct performance of assembly and/or machining of the workpiece which it carries.

Figure 17:
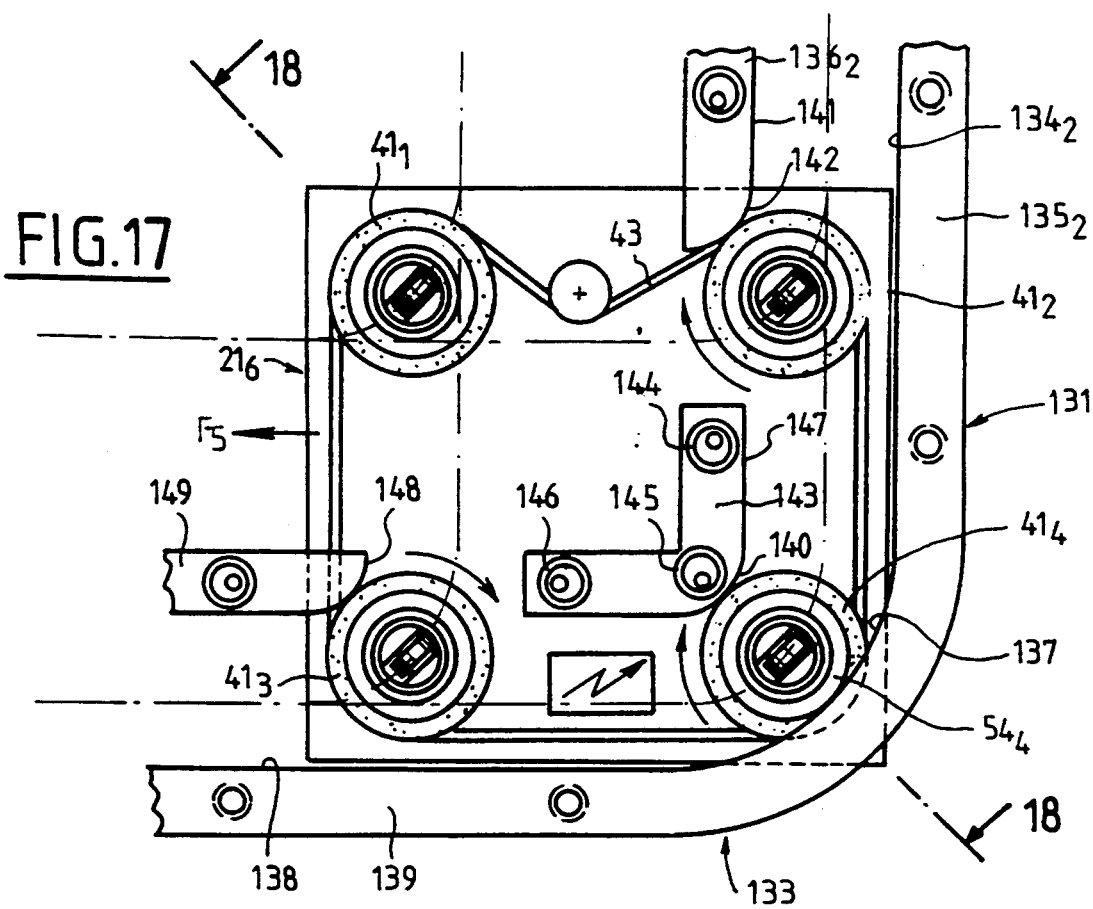
FIG. 17 represents a pallet in a simple bend, changing direction without changing spatial orientation.
Figure 18:
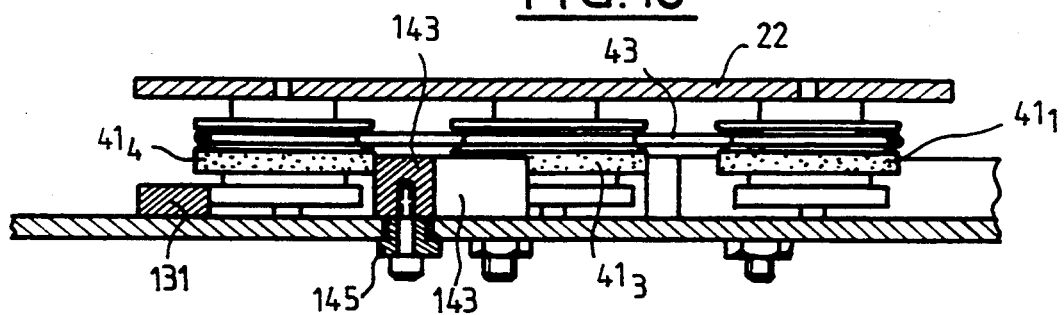
FIG. 18 represents a sectional view along the line 18—18 of FIG. 17.

FIGS. 17 and 18 show a pallet, as represented at 21-6 in FIG. 1, in the position in which it is midway between the bypass part 16 parallel to the general line 11 and the branch 15 of the bypass intended to connect part 16 with the downstream of the general circulation line.

The plane face 134-2 of the rail 135-2 is extended by a cylindrical part 137, which is connected to a plane part 138 of the branch 15 of the entrainment rail perpendicular to the branch 16.

The drive wheel 41-2, which interacted with the face 141 of the rail 136-2, interacts with the convex, inwardly curved face 142 which forms the end of the rail 136-2. The drive wheel 41-4 interacts with the outer face 147 of a bracket 143 whose outer corner 140 is inwardly curved. The bracket 143 is mounted by means of devices with an eccentric and an annulus made of elastomer, 144, 145 and 146, respectively, so that it also produces the prestress pushing the block 27-4 of the pallet via the roller bearing 54-4 against the inner face 137 of the rail 131. The drive wheel 41-3 reaches the convex, inwardly curved end 148 of a prestress rail 149.

Figure 19:
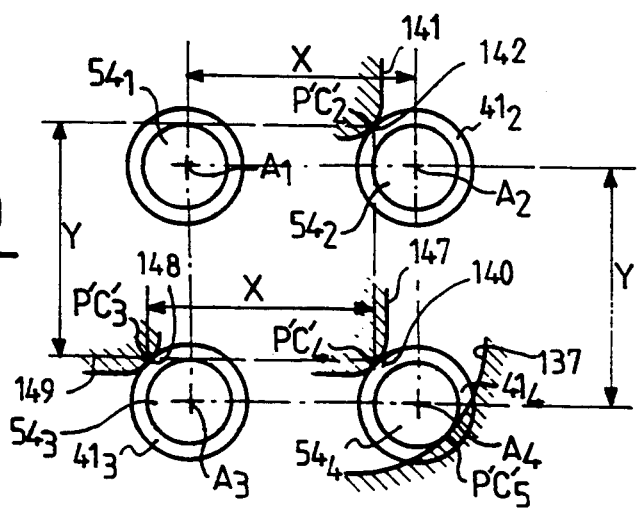
FIG. 19 represents an illustration of the determination of the inwardly curved parts of the entrainment and guidance rails at the connection between a circulation branch and a perpendicular branch.

FIG. 19 shows the blocks with roller bearings 54-1, 54-2, 54-3, and 54-4 whose axes of rotation $A_1$, $A_2$, $A_3$, and $A_4$ on the pallet form the vertices of a rectangle whose sides have the dimensions Y and X. The points of contact of the pulleys with their respective rails are $P'C'_2$ $P'C'_3$ and $P'C'_4$.

In order to permit a bend in the path of travel without change in orientation of the pallet, the curves 142 and 140 are produced by construction so that the distance between the two points of contact $P'C'_2$ and $P'C'_4$ is always equal to the distance Y between axes $A_2$ and $A_4$ of the blocks with pulleys 41-2 and 41-4, so that the straight line defined by end points $P'C'_2$-$P'C'_4$, thus defined moves parallel to itself during the route of the pallet through this bend.

At the same time, as the direction of travel of the pallet changes the point of contact $P'C'_3$ describes the curve 148 which, by construction, is produced so that the distance between the points of contact $P'C'_4$ and $P'C'_3$ is always equal to the distance X between the blocks with pulleys 41-3 and 41-4 and so that the straight line $P'C'_3$-$P'C'_4$ thus defined moves parallel to itself during the route of the pallet through this bend.

The pallet is thus guided at three points of contact which define two perpendicular straight lines which move parallel to themselves while each respectively maintains the same spatial orientation during the bend. Opposite these three points of contact, the roller bearing 54-4 bears upon the concave cylindrical surface 137 at one point of contact $P'C'_5$.

As the pallet goes through the bend, the point of contact P'C'₅ describes the curve 137, while the point of contact P'C'₄ describes the curve 140. The shape of the curve 137 can therefore be deduced from the shape of the curve 140 by interposing a constant gap P'C'₄–P'C'₅ between the two curves, the gap being equal to the sum of the thickness of the drive pulley 41-4 and of the diameter of the roller bearing 54-4.

The shape of the curves 142, 140, and 148 of the entrainment rails and the complementary shape of the guidance rail 137 are determined so as to optimize the passage of the pallet through the curve at very high speed.

Generally these various curves are quarters of a circle which have an identical radius, for example of 20 mm, for the curves 142, 140 and 148 and a radius equal to 20 mm to which the sum of the dimensions of the radius of the pulley and of the radius of the roller bearing is added for the curve 137. The curve 140 and 137 are quarter of a circle in shape and are concentric.

The entrainment of the pallet 21-6 is carried out by three drive wheels 41-2, 41-4, and 41-3, which run without parasitic skidding or slipping on the cylindrical surfaces 142, 140, and 148 which their entrainment rail in prestressed bearing respectively exhibits. The guidance of the pallet is ensured, also permanently, by the roller bearing 54-4 running on the cylindrical surface 137 which directly counteracts the effects of centrifugal force generated by the speed of the pallet as it journeys round a curve.

During this simple bend the pallet thus changes circulation direction without changing its spatial orientation. The pallet 21-6 is entrained and held in a manner which is as efficient as in its previous movements in the straight lines and the crossroads described previously.

After this bend, the pallet continues its journey in the branch 15, as shown in the lower part of FIG. 1. In the embodiment shown in FIG. 1, the straight branch 132 of the general circulation line is continued by a curved branch 151. The stressing rail portion 152, having a convex end face 152 at its entrance, is also continued by a curved part 154 parallel to the curved part 151. The curved parts 151 and 154 are generally concentric with one another and whose center is shown at C''.

The organization of the connection between the exit branch 15 of the bypass 13 is analogous with that of the connection between the branch 14 for entering the bypass and, in the embodiment shown in FIG. 1, comprises a retractable stop 155 with cylindrical surface 156, a bracket 157 with a rounded outer corner 158, and branches 159 and 161.

Figure 20:
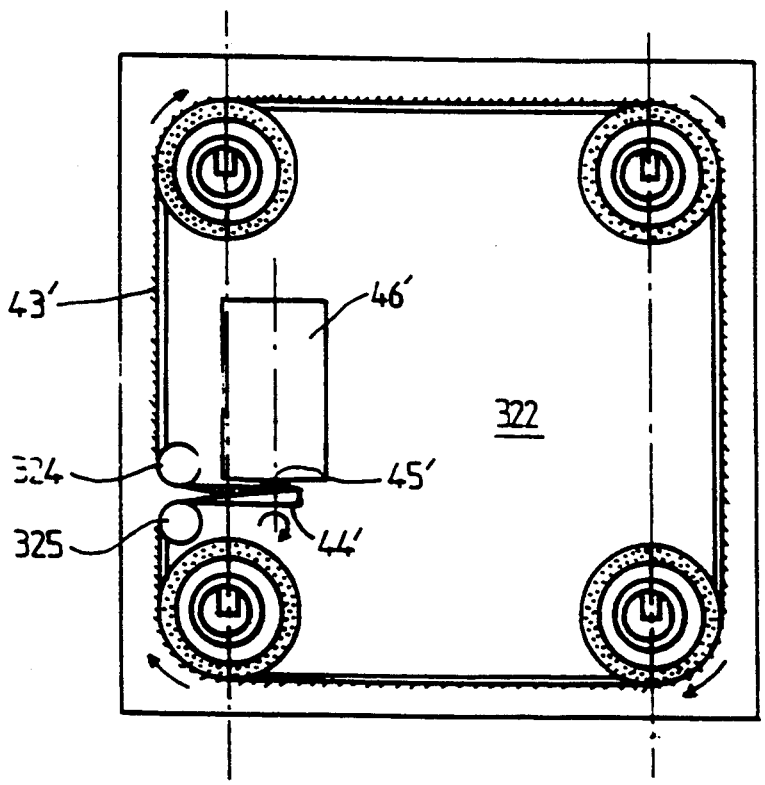
FIG. 20 represents a plan view from below of a pallet for another embodiment.

FIG. 20 shows another embodiment of the entrainment of the drive pulleys of a pallet. In this embodiment, the electric motor or geared motor 46' is fastened to the inner face 322 of the pallet. In this embodiment, a belt 23' passes over the pulley 44' of the output shaft 45' of the motor. The belt may be toothed and produces the entrainment of the drive wheels, as in the previously described embodiment, by passing over deflecting pulleys 324 and 325.

A pallet is thus available whose upper face is perfectly plane, not having any projection.

Figure 21:
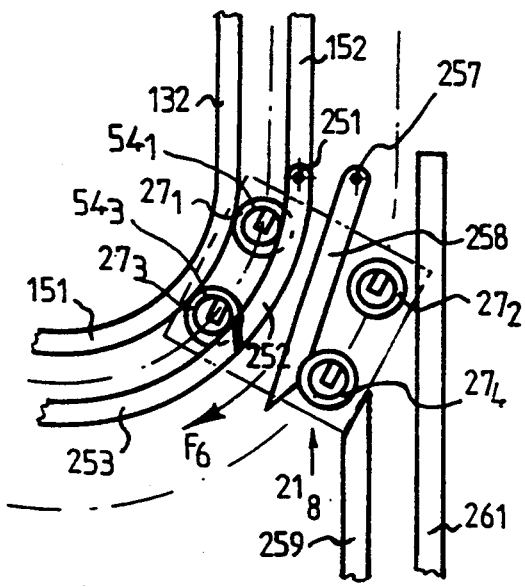
FIG. 21 represents a plan view of an installation providing switching points toward a curved part of the circulation line, showing the change in direction of a pallet with modification of its orientation, and towards a straight part.
Figure 22:
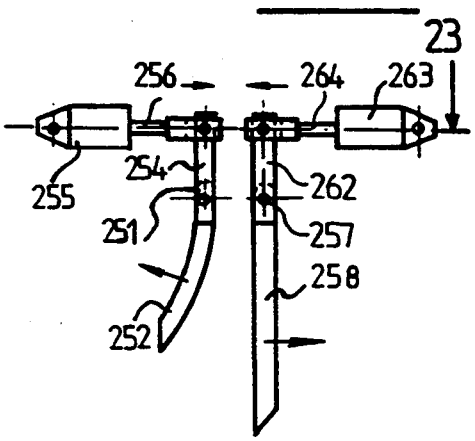
FIG. 22 represents the control of the switching points.
Figure 23:
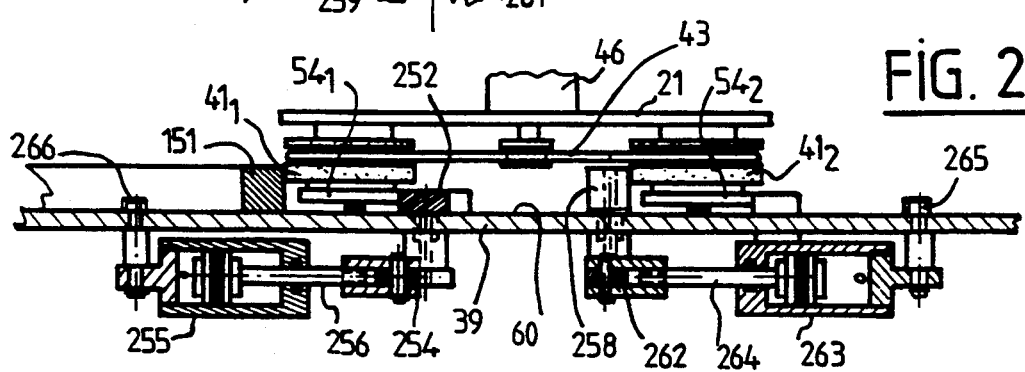
FIG. 23 represents a sectional view along the line 22-23 showing an embodiment of this control.

FIGS. 21 to 24 show a further embodiment of the invention. In this embodiment, as shown in FIG. 21, at the end of the rail 152 there is connected, pivoting about a spindle 251, a circular portion of rail 252. In one position, the end of the pivoting position abuts against a circular rail 253. The straight part of the rail 132 is continued, without interruption, by a circular part 151. The action of a jack 255 is exerted on the circular portion 252 by its rod 256, by means of a connecting rod 254, as shown in FIG. 22. The curved portion 252 rests on the upper face 60 of the floor 39 of the installation, as shown in FIG. 23.

Figure 24:
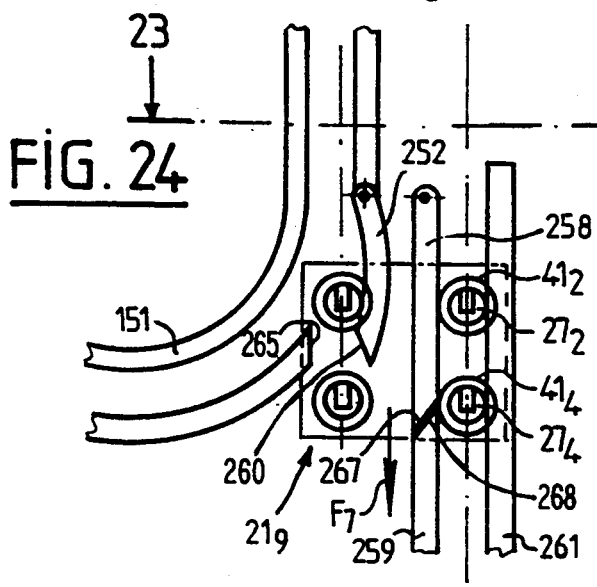
FIG. 24 represents a plan view of an installation analogous to the installation shown in FIG. 21 but in another condition.

Close to the circular portion 252 there is mounted, pivoting about a spindle 257, close to the spindle 251, a straight portion of rail 258 which, in the condition shown in FIG. 24, is connected to a straight rail 259. The rail 259 constitutes, together with a rail 261, a straight circulation track. The straight portion 258 contacts with the upper face 60 of the floor 39 of the installation. The straight portion 258 is subjected, by means of a connecting rod 262, to the action of a jack 263 with a rod 264. The jack 263 is fixed close to the lower face of the floor 39 by a bolt 265. A corresponding bolt 266 fastens the jack 255 as shown in FIGS. 22 and 23.

In the condition represented in FIG. 21, the straight circulation track made by the rails 132 and 152 is continued by a curved part, analogous with the arrangement shown in FIG. 1. A pallet 21-8 takes a circular part of track, for example, to be brought to another general circulation line parallel to the line 11 (not shown).

The rail 132 is an entrainment rail, while the rail 152 is a guidance and prestressed bearing rail. The circular rail 252 is also a guidance and prestressed bearing rail when it is pushed by the action of the jack 255 against the roller bearings 54-1 and 54-3 of the pallet 21-8. The rail 253, which acts as an extension rail 252, is similarly a guidance and prestressed bearing rail. Under these conditions, the pallet 21-8 follows an inwardly curved route with modification of its spatial orientation according to a radius of curvature. The radius of curvature, by construction, is necessarily greater than that of the bends in which the pallets 21-2 and 21-6, as described previously, do not modify their orientation when changing direction.

If, on the other hand, by the action of the jacks 255 and 263, the straight portion of rail 258 is brought into the extension of the straight rail 259 and the curved part of rail 252 is moved away from the curved rail 151, a pallet 21-7 continues its straight movement as shown at 21-9. The blocks 27-4 and 27-2 of the pallet become operational for its straight guidance by interacting with the straight part 258 of rail 259 and the straight rail 261. To achieve this, the curved part 252 moves away from the curved rail 151 as the jack 255 is no longer being pressurized, while the jack 263, under pressure, holds the straight part of rail 258 in the extension of the straight rail 259. The pallet is thus guided in a straight line, in the extension of the general line 11.

The rail 258 is an entrainment and prestressed bearing rail when it is pushed by the action of the jack 263 against the drive pulleys 41-2 and 41-4 of the pallet 21-9, as is the rail 259, which extends it. The rail 261 guides the roller bearings 54-2 and 54-4 of the pallet. The straight trajectory of the pallet 21-9 is thus strictly determined, without play, as represented diagrammatically by the arrow F7 in FIG. 24.

The ends of the parts of rail, respectively 260 for the curved rail 252, and 268 for the straight rail 258, are oblique and the opposing faces, 265 and 267 respectively, are also oblique, to ensure good continuity of the guidance or of the entrainment as shown in FIG. 24.

In an installation according to the invention, the bends may be carried out over a very short radius, without modifying the orientation of the pallet. This results in minimum bulk for the installation.

In the same installation, the bends may be carried out with modification of the orientation of the pallet when, for example, ergonomics or technical necessities are more important than the bulk criterion of the surface area of the bends.

The pallet is guided in a continuous manner, without play, under permanent prestress, and cannot assume any parasitic movements, despite soiling, which the floor may exhibit, thus ensuring perfect stability for the workpiece which it supports.

The drive wheels entrain the pallet, becoming free, in part, from the weight of the load transported, without skidding and without differential movement in the bends, thereby avoiding wear on the covering of the wheels.

The circulation speed of the pallets may be raised and the pallets follow one another with a minimum gap without the risk of collision.

According to the configuration of the circulation route, the pallet is entrained by one, two, or three pulleys which are, therefore, drive pulleys.

The role of the blocks of a pallet varies according to the configuration of the circulation.

The roles of the two self-steering rails serving for the entrainment of the pallet and for its prestressed guidance may also vary.

The same rail may serve for entraining and stressing the wheel against the other rail or else these roles may be assigned, respectively, one to each rail.

Rail portions can be retracted or pivoted so as to respond to the various conditions imposed by the desired configurations.

The prestress means, instead of being integral with one or other of the rails, may be integral with the pallets.

An installation aiming at such an embodiment is shown in FIGS. 25 to 30.

A pallet 401 with a rectangular outline, limited by sides 402, 403, 404 and 405, as shown in FIG. 26, is equipped at its corners with front blocks 406 and 407 and rear blocks 408 and 409, respectively. Such a block, for example block 406, comprises a cylindrical, tubular block body 411, shown in FIG. 25, fixed to the body 412 of the pallet, or platform, by screws 413. Inside the block body there is housed, by means of two ball bearings 414 and 415, a rolling device 416 whose self-orientable wheel 417 rests on the floor 418 of the installation, the rotation axle 419 of the wheel being offset with respect to the vertical axis 421 of the block body.

On the block body a first wheel device 422 and a second coaxial wheel device 423 are mounted by means of ball bearings 424 and 425, respectively. The first wheel device 422 comprises, integral with its body, a pulley 423 over which there passes an entrainment belt 424 connected to an electric motor which the pallet carries. The wheel device 422 has a rim 420 fitted with a tread strip or "tire" represented, in this embodiment, in the form of a toric snap ring 426 made of an elastic material. The second wheel device 423 comprises a rim 427 mounted idly around the block body 411 by means of a ball bearing 425. This rim is also fitted with a tread strip or "tire" 428 made of an elastic material. The outer diameters of the tread strips or "tires" 426 and 428, in the non-stressed condition, are equal and of identical shapes for the purpose of simplicity.

The "tire" 426 is suitable for interacting, when the wheel 417 runs on the floor in the condition shown in FIG. 25, with the vertical face 429 of a first rail 431 fixed to the floor 418 by screws 432. The rail 431 has a base which is thinner than its upper part, the lower vertical part 433 of the said rail thus being at a distance from the "tire" 428.

A second rail 433 is fixed to the floor 418 by screws 434. It is parallel to the rail 429 and exhibits a lower part 435 which is thicker than the upper part. The vertical lower face 436 of the rail 429 is thus able to interact with the "tire" 428 while the upper part 441 remains at a distance from the "tire" 426 of the upper wheel.

The distance between the operational faces 429 and 436 of the two rails 431 and 433 is smaller by about 0.8 mm than the outer diameter of the tread strips or "tires" in the non-stressed condition.

When the upper wheel 422 is rotationally entrained by the belt 424, the block 406, stressed elastically by interaction of the lower "tire" 428 against the rail 433, pushes the upper "tire" 426 against the upper face 429 of the rail 431, thus setting the pallet in motion. The pallet is guided in a constant manner and without play by prestressed interaction of its blocks with the guidance/entrainment rails.

Figure 28:
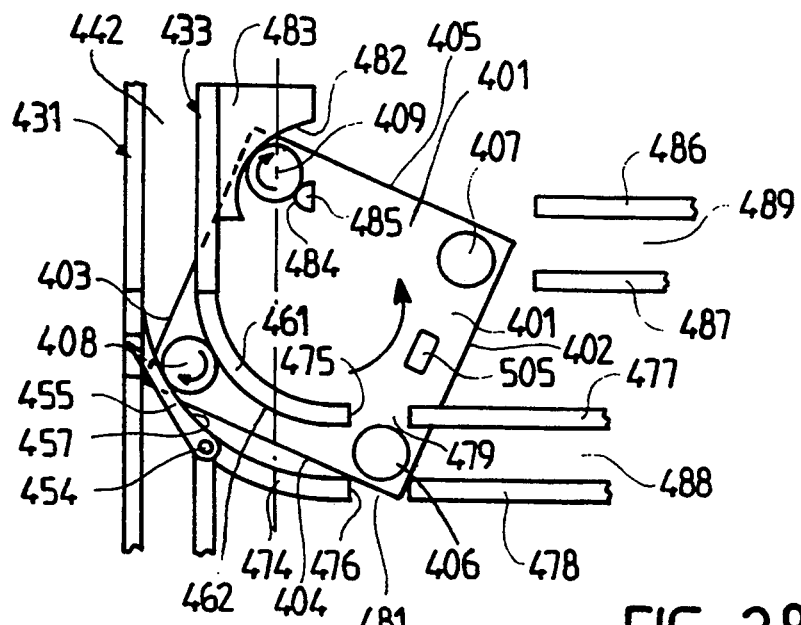
FIG. 28 represents a plan view of an installation analogous to the installation shown in FIG. 26 but shows a pallet during a bend.
Figure 29:
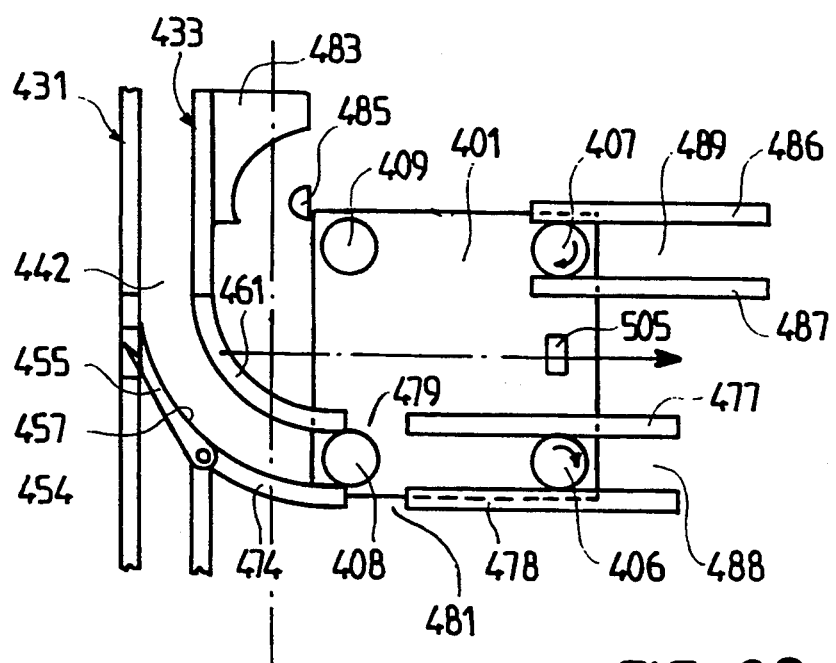
FIG. 29 represents a plan view analogous to FIG. 28 but shows the pallet after it has cleared the bend.
Figure 30:
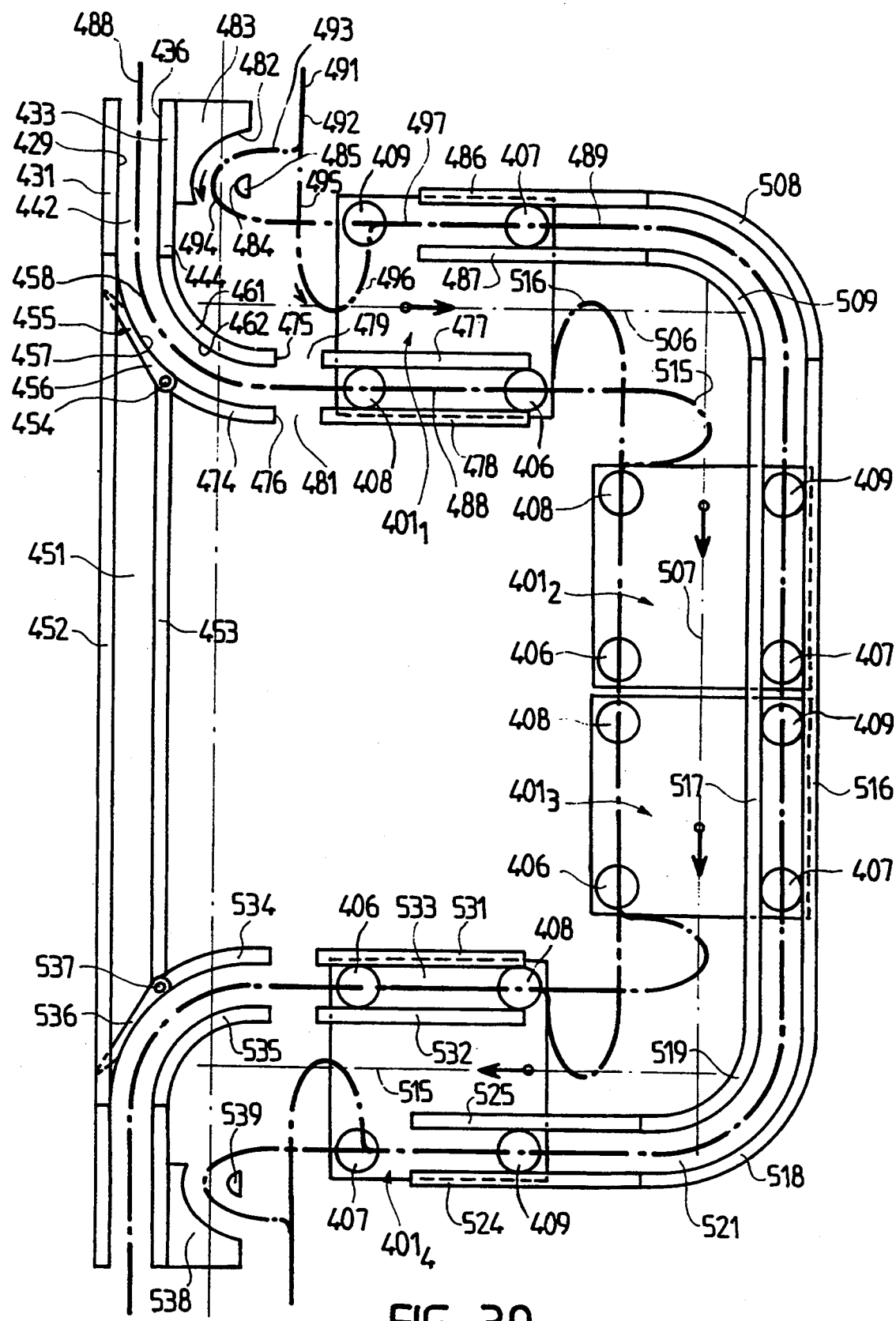
FIG. 30 represents a view of an installation according to this embodiment.

FIGS. 26–30 show the means provided for causing a pallet to pass from a straight trajectory to a perpendicular straight trajectory, around a bend with minimum bulk in a three-track crossroads. The track 442, shown in FIG. 26, is made by the straight rails 431 and 433. The track is extended by a straight track 451 made by straight rails 452 and 453. The track also comprises, mounted rotationally about a spindle 454, switching points 455, shown in FIGS. 26 and 27. The body 456 of the switching point 455 has an inner vertical face at the upper part 457 closer to the mean line 458 of the curved track than the lower part 459, as shown in FIG. 30. The curved rail 461, which extends and has the same configuration as rail 433, thus exhibits an inner face 462, which extends the inner face 436 of the straight rail 433.

FIG. 26 shows the condition of the installation in the case where the pallet, arriving via the straight track 442 must continue its straight trajectory along the track 451. In this condition, the switching points 455 have, by pivoting about the spindle 454, assumed the position according to which their face 503, opposite the face 457, is in the extension of the inner face of the straight rail 433. The operational face of the switching points includes a vertical face 502, shown in FIG. 27, set back with respect to the face 503. It is with the face 503 that the "tire" 428, of the wheels 427 of outer blocks 406 and 408 mounted idly about the vertical axis of the blocks, interacts.

In the condition shown in FIG. 26, the block 409 crosses the track 488 made by rails 477 and 478. The pallet remains on track by interaction of the block 408 with the straight rail 452 and the switching points 456 and by the interaction of the block 406 with the rails 452 and 453 extending the rails 431 and 433.

The actuation of the switching points 455 is controlled by a label 505 with electronic effect which the pallet carries.

The rotation of the switching points 454 is done under the effect of a cylinder 471, shown in FIG. 27, fixed under the lower face 472 of the floor 418, and which is connected by a pipeline 473 to a pressure source.

Extension of the switching points 455, as shown in FIGS. 28 and 29, is accomplished by a curved rail 474 fixed to the floor 418a parallel to the rail. The frontal faces 475 and 476 of the curved rails, respectively 461 and 474, are co-planar. Gaps 479 and 481 between straight rails 477 and 478, which are perpendicular to the rails 431 and 433 and curved rails 461 and 474, respectively, are of a suitable width to allow the blocks 407 and 409 of a pallet 401 moving perpendicularly to rails 477 and 478 to pass freely.

When a pallet circulates to the general line 488 shown in FIG. 28 with its blocks 406, 408 in the track 442, the pallet's entrainment in line 488 takes place by interaction of the "tires" 426 of the outer front and rear blocks with the upper vertical face 429 of a rail against which they are pushed by the bearing of the "tires" 428 against the lower vertical face 436 of the rail 433. Circulation of the pallet thus takes place without any possibility of play. This entrainment and guidance continues until the front block 406 arrives in the curved part of the track limited by the curved rail 461 and the switching points 455.

The inward curvature given to the trajectory of the blocks 406 and 408 entrains a change in orientation of the pallet, an intermediate position being shown in FIG. 28. In this position, in which the front outer block 406 has escaped the guidance of the curved rails 474 and 461, the continuity of guidance and of entrainment of the pallet are ensured not only by the block 408 but also by interaction of the rear inner block 409 with, on the one hand, the inwardly curved face 482 of a cam 483 fixed to the floor 418 of the installation and, on the other hand, the inwardly curved face, with a smaller radius of curvature 484 of a facing cam 485. The inwardly curved face 482 is debeaded as is the operational face of the rail, so as to interact with the upper "tire" of the block. The operational part of the inwardly curved face 484 of the cam 485 is also debeaded, as is the inner face of the straight rail 433, so as to interact with the lower "tire" 428 of the block 409.

The pallet is held laterally in this condition of a bend inside a crossroads with three perpendicular tracks, with the same effectiveness as during its journey on the straight part of the track 442. That is to say, the pallet is held by means of the continuous permanent entrainment/guidance of at least two of its blocks, without the possibility of play in one direction or the other.

The pallet continues to be held laterally by the two blocks 408 and 409 until the block 406 interacts with the straight rails 477 and 478 before the block 409 has escaped the guidance of the curved cams 483 and 485, as shown in FIG. 28.

The pallet also continues to be held laterally by the two blocks 406 and 408 until the block 407 interacts with the straight rails 486 and 487 before the block 408 has escaped the guidance of the curved rails 461 and 474, as shown in FIG. 29.

The pallet further continues to be held laterally by the two blocks 407 and 406 until the block 408 fulfills the role of the block 406 guided by the straight rails 477 and 478, as shown in FIG. 30.

The dot and dash line 491 in FIG. 30 shows the trajectory of the center of the block 409. This trajectory comprises, after a straight part 492, an open loop 493, with two lateral branches connected by a curve 494, parallel to the operational face 482 of the cam 483. A dot and dash line 495 shows the trajectory of the block 407. This trajectory, starting from the straight part, comprises a loop 496 which extends perpendicular to loop 493.

The above-described trajectories are followed by a straight part 497 parallel to the rails 486 and 487.

The pallet 401, after having circulated in the branch 506, shown in FIG. 30 and perpendicular to the entry branch, again changes direction, so as to make it circulate in the branch 507, perpendicular to the branch 506. The second change in direction is controlled by inwardly curved rails 508 and 509, respectively extending the straight rails 486 and 487. These rails 508 and 509 serve for the guidance/entrainment of a pallet via blocks 409 and 407.

Dot and dashed lines 515 and 516 represent the routes of the blocks 406 and 408, respectively, during the bend.

FIG. 30 shows two pallets $401_2$ and $401_3$ on the track 507 parallel to the general circulation track in machining or assembly positions.

The passage of a pallet from the branch 507 to the perpendicular branch 515 for ultimate connection to the general line 451 is done in a fashion analogous to the passage from branch 506 to branch 507. The straight parts 516 and 517 of the rails are extended by curved parts 518 and 519 making a curved track part 521. Rails 518 and 519 serve for the guidance/entrainment of a pallet via its blocks 409 and 407.

The guidance/entrainment of the pallet $401_4$ along the track 515 is ensured by the pair of straight rails 531 and 532 making a track 533 for the blocks 406 and 408 of the pallet. The pallet is also guided by the pair of rails 524 and 525 interacting with the blocks 407 and 409 of the pallet. The pair of rails 531, 532 is slightly downstream of the pair of rails 524 and 525.

The pallet is returned to the general line by means analogous to those which have been described hereinabove for the passage from the general line to the bypass line 506. These means comprise two curved rails 534 and 535. The rail 534 is extended by switching points 536 analogous to the points 455 and mounted rotationally about a pivot 537. Permanent entrainment/guidance of the pallet during its bend, in this three-track crossroads, is obtained by interaction of the block 407 with a first cam 538 and a second facing cam 539 so as to ensure the continuity of the guidance and of the entrainment of the pallet as the rear outer block 408 escapes the guidance of the straight rails 531 and 532 before being guided once again by the circular rails 534 and 535.

The prestress means for laterally holding the blocks of the pallet integral with the pallets via the play of the elasticity of its "tires" may be duplicated by the means for elastically fastening the cams and/or rails to the floor of the installation as described in one of the previous embodiments.

In the previously described embodiments, the change in circulation direction of a pallet at a cross-roads is by 90°. The invention also aims at embodiments with different angles in the change in direction.

In the indications hereinabove, of the position of the blocks at the corners of a pallet, it should be taken into account that, in the Figures, the views correspond, as mentioned, to those of an observer placed under the floor of an installation, it being assumed that the floor is transparent.

I claim:

1. An installation for circulating workpiece-carrying pallets, said installation comprising:

support means having a substantially horizontal surface;

pallets having a rectangular shape and each comprising a plurality of self-orientable rolling members adapted to roll on said substantially horizontal surface while supporting the pallet;

interacting means having a common part on said support means and an on-board part on each pallet, the common part and the on-board part adapted to cooperate with each other for driving and guiding the pallets with respect to said support means;

said on-board part of said interacting means comprising on said pallet:
sets of horizontal wheels superimposed with respect to each other, each set of horizontal wheel being arranged about a corner of the pallet, substantially above a respective selected one of said self-orientable rolling means; and
said sets of horizontal wheels comprising driven wheels and freely-rotating guidance wheels;

said common part of said interacting means comprising a plurality of rail members, said rail members being generally parallel to each other two by two, and arranged in selected positions on said substantially horizontal surface for defining main track sections, transverse track sections, and interconnections therebetween;

said horizontal wheels of a pallet being compressibly lodgeable between said parallel rail members substantially in any position in said main track sections, transverse track sections, and interconnections therebetween;

said common part of said interacting means further comprising actuable rail insert means arranged on said substantially horizontal surface about said interconnections, for controllably cooperating with horizontal wheels of a pallet, for causing such pallet to enter a transverse track.

2. An installation according to claim 1, wherein said rail members comprise guiding rail elements having a bearing surface adapted to cooperate with said freely-rotating horizontal wheels.

3. An installation according to claim 1, wherein said actuable rail insert means is horizontally pivotable.

4. An installation according to claim 1, wherein said rail members comprise entrainment rail elements having a bearing surface adapted to cooperate with said driven horizontal wheels.

5. An installation according to claim 4, wherein said entrainment rail elements have a bearing surface the cross-section of which is vertical.

6. An installation according to claim 1, wherein at least certain of said horizontal wheels have a pre-stressed resilient tread strip.

7. An installation according to claim 6, wherein said prestressed resilient tread strip has the shape of a toric snap ring.

8. An installation according to claim 1, wherein, at a work station, said support means further comprises additional guiding means cooperating with a reference edge of the pallet.

9. An installation according to claim 8, wherein, at said work station, said support means further comprises means for indexing a pallet, opposite to said reference edge of said pallet.

10. An installation according to claim 1, wherein said plurality of rail members comprise rail elements, certain of said rail elements are arranged for pre-stressing onto a horizontal wheel interacting therewith.

11. An installation according to claim 10, wherein said certain of the rail elements are adjustable in position on said floor of said support means by eccentric mounting means.

12. An installation according to claim 11, wherein said eccentric mounting means has a peripheral annulus of an elastomer material.

13. An installation according to claim 1, wherein said driven horizontal wheels are driven at the same peripheral speed in a pallet.

14. An installation according to claim 13, wherein said driven horizontal wheels are each interconnected with a driving pulley by a common belt driven by a common motor.

15. An installation according to claim 14, wherein, said driven horizontal wheel and said driven pulley of each set are coaxially arranged about the same vertical axis.

16. An installation according to claim 15, wherein said vertical axis does not intersect the horizontal axis of the underlying self-orientable rolling means, thereby preserving the self-orientability of the self-orientable rolling means.

17. An installation according to claim 1, wherein each pallet has four self-orientable rolling means about corners thereof, and said on-board part of said interacting means comprises, on each pallet:
four sets of superimposed horizontal wheels, each set being positioned substantially above a respective one of said four self-orientable rolling means; and
each set of horizontal wheels on a pallet comprising a driven horizontal wheels and a guidance free-wheeling horizontal wheel.

18. An installation according to claim 17, wherein said plurality of rail members define straight or curved tracks with interconnections between the tracks at right angles, and each pallet is guided along the track by two lateral sets of said horizontal wheels, whereby the spatial orientation of the pallet changes together with its direction of motion.

19. An installation according to claim 17, wherein, when turning from a main track to a transverse track at an interconnection, the pallet is guided by outer lateral sets of said horizontal wheels, and further guided by an inner rear set of said horizontal wheels when the front one of the outer lateral sets of horizontal wheels is not guided.

20. An installation according to claim 17, wherein, when turning from a transverse track to a main tract at an interconnection, the pallet is guided by outer lateral sets of said horizontal wheels, and is further guided by an inner front set of said horizontal wheels when a rear outer lateral set of said horizontal wheels is not guided.

21. An installation according to claim 17, wherein said plurality of rail members define straight tracks, with interconnections of such straight tracks, paths of said straight tracks are generally at right angles, each pallet is guided along one of said straight tracks by two lateral sets of said horizontal wheels, and said pallet is guidable into an interconnection by two front or rear sets of said horizontal wheels whereby the spatial orientation of the pallet is maintained.

22. An installation according to claim 21, wherein said rail members adjacent said interconnections are arranged with complementary guidance members having curved bearing surfaces, the interconnection enable translation of the pallet parallel to itself while it enters a transverse path.

* * * * *